United States Patent [19]

Paul et al.

[11] Patent Number: 4,483,289

[45] Date of Patent: Nov. 20, 1984

[54] SYNTHESIS PROCEDURE AND COMBUSTION CHAMBER WITH VARIABLE TURBULENCE

[76] Inventors: Marius A. Paul, Aleea Baraj Cucuteni nr. 10; Eugen Sarateanu, Calea Grivitei 397, both of Bucharest, Romania

[21] Appl. No.: 336,374

[22] Filed: Dec. 29, 1981

[51] Int. Cl.³ .......................... F02F 3/24; F02B 23/00; F02B 19/04
[52] U.S. Cl. .................................... 123/263; 123/269; 123/289; 123/671; 123/307
[58] Field of Search ........ 123/262, 263, 269, 289–291, 123/671, 193 P, 306, 307

[56] References Cited

U.S. PATENT DOCUMENTS

| | | | |
|---|---|---|---|
| 887,393 | 5/1908 | Haselwander | 123/307 |
| 2,012,086 | 8/1935 | Mocr | 123/263 |
| 3,386,422 | 6/1968 | Eyzat | 123/269 |
| 4,005,684 | 1/1977 | Habu | 123/269 |

FOREIGN PATENT DOCUMENTS

| | | | |
|---|---|---|---|
| 0674229 | 11/1939 | Fed. Rep. of Germany | 123/671 |
| 0357298 | 12/1905 | France | 123/671 |
| 0789241 | 10/1935 | France | 123/290 |
| 0350423 | 7/1937 | Italy | 123/262 |

*Primary Examiner*—Craig R. Feinberg
*Attorney, Agent, or Firm*—Karl F. Ross; Herbert Dubno

[57] ABSTRACT

The combustion structure of an internal combustion engine comprises a cavity formed in the end wall of the piston and a projection on said piston adjacent its cavity to that the projection in the injection, ignition and combustion phase of the cycle only constricts communication between the two cavities and defines with the cavity in the wall a combustion chamber in which at least three distinct swirls of fluid are induced by the shape of the projection and a resultant three-dimensional circulation sweeps throughout this chamber. The fuel is injected into the circulation in this chamber and ignition takes place therein as well.

5 Claims, 7 Drawing Figures

SYNTHESIS PROCEDURE AND COMBUSTION CHAMBER WITH VARIABLE TURBULENCE

CROSS REFERENCE TO RELATED APPLICATION

This application is a national phase application corresponding to PCT/RO81/00002 filed Apr. 21, 1981 and based, in turn, on a Romanian national application 100981 filed Apr. 27, 1980.

FIELD OF THE INVENTION

This invention refers to a procedure and a combustion chamber with variable turbulence for use in high speed engines and to a method of operating same.

BACKGROUND OF THE INVENTION

In the Ricardo procedure and combustion chamber, high speed operation is effected using a divided chamber, with swirl organized circulation, the connection section between the pre-combustion chamber and the main chamber being constant during the whole cycle and of an optimized value of one percent of the active surface of the piston. On the other hand, the process and the combustion chamber have the disadvantage that during the fuel passage in both directions through the choke section high gasodynamic losses arise and cause relatively high specific fuel consumption and do not assure a complete organization of the fluid circulation in the divided chamber, the central and peripherical areas being left unorganized.

A unitary combustion chamber and its operating process are known in which the absence of chokes in the fuel path assures a relatively low fuel consumption, but this system has the disadvantage that high speed operation is not possible because of a reduced level of the swirl organization.

SUMMARY OF THE INVENTION

According to the present invention, these procedure and synthesis combustion chamber eliminate the above disadvantages are obviated in order to achieve a low fuel consumption and to increase the flexibility of the engines with compression ignition, both for the speed range and/or the load range, and for the size range, by assuring an integral volumetric organization of the fluid circulation in the combustion chamber. This is achieved by dividing only temporarily the space of the swirl chamber from the combustion chamber located above the piston, only during the compression period, for the rest of the cycle the combustion chamber forming a unitary whole with the swirl chamber, the combustion process in its aggregate constituting a synthesis between the combustion precesses of the unitary and divided chambers, the intensification of the swirl being obtained as a result of the vectorial summation of at least three swirls, with tridimensional circulation and the revaluation of the threshold effect created by the piston, which points out the effect of the fluid passage between the two enclosures of the combustion chamber which are separated by a space profile that penetrates in the separating channel. This profile is defined by at least three directing surfaces, which generate swirls with tridimensional circulation and which constitute the mobile braking threshold of the swirling enclosure, concerning the rich burning mixture in the passage. The fluid circulation in the swirl enclosure is determined so that it should meet the fuel jet in the equiflow and displace a part of the fuel onto the incandescent head of a spark plug.

SPECIFIC DESCRIPTION

The combustion synthesis procedure, according to the present invention, consists in the separation of the turbulence chamber space from the combustion chamber compartment located above the piston, only during the injection, mixture making and combustion periods, namely during the final compression phase, during the rest of the cycle the combustion chamber being unitary. Thus, a reduction of the gasodynamic losses as well as a complete organization of the circulation, as a consequence of the vectorial summation of at least three swirls with tridimensional circulation are assured.

According to the present invention, the combustion procedure leads to the intensification of the turbulence by turning to good account the threshold effect which emphasizes the passage effect. The highest levels of the two effects are situated at different angles in the evolution of the cycle, the passage effect appearing the first.

According to the invention, the combustion chamber is made up of an enclosure a, which represents the divided space situated in a cylinder head 11 and an enclosure b, situated in a piston 2, which represents the second space of the combustion chamber. The two combustion spaces a and b, are linked by a groove c, formed between an inner surface d of a refractory insert 3 and an adequate profile e, forming one piece with piston 2. The groove c has a variable section only at the end of the compression phase on a period of approximately ±15°–20° RA round the bottom dead center. The maximum section of the groove c is established in such a way that the withdrawal of the piston 2 unifies the spaces a and b, and creates an approximately unitary chamber.

The spatial profile e on the piston 2 is defined by two slope angles, namely f° and g°, which also represent the main direction of organizing the circulation of fluid between enclosure a and enclosure b.

The two angles f° and g° ensure the formation of some swirls h, respectively of some symmetrical-toroidal swirls i, which totalize vectorially and generate a tridimensional circulation completely organized in the whole volume of the combustion chamber. Ensuring a completely organized circulation in the whole volume of the chamber, we may use some injectors 4 with one or more injection ports whose jets are correlated with air circulation through the combustion chamber.

The possibility of using multi-port injectors permits the application of the invention, to the large size engines too.

The synthesis combustion chamber formed by the enclosure a temporarily divided and the enclosure b may be achieved in different embodiments, both as far as the form of enclosure a and the form of enclosure b are concerned, as well as the partition ratio between these enclosures.

Figures 1, 3:
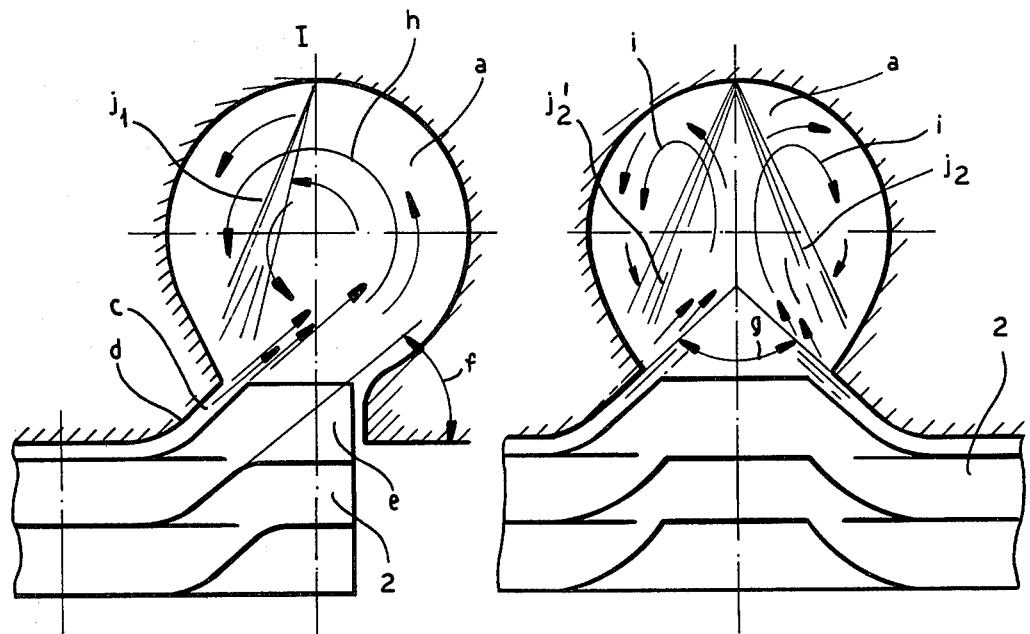
FIG. 1 is an axial section through a combustion chamber formed at the free end of a piston of an engine according to the invention.
FIG. 3 is a section taken along the line I—I of FIG. 1.
Figures 2, 4:
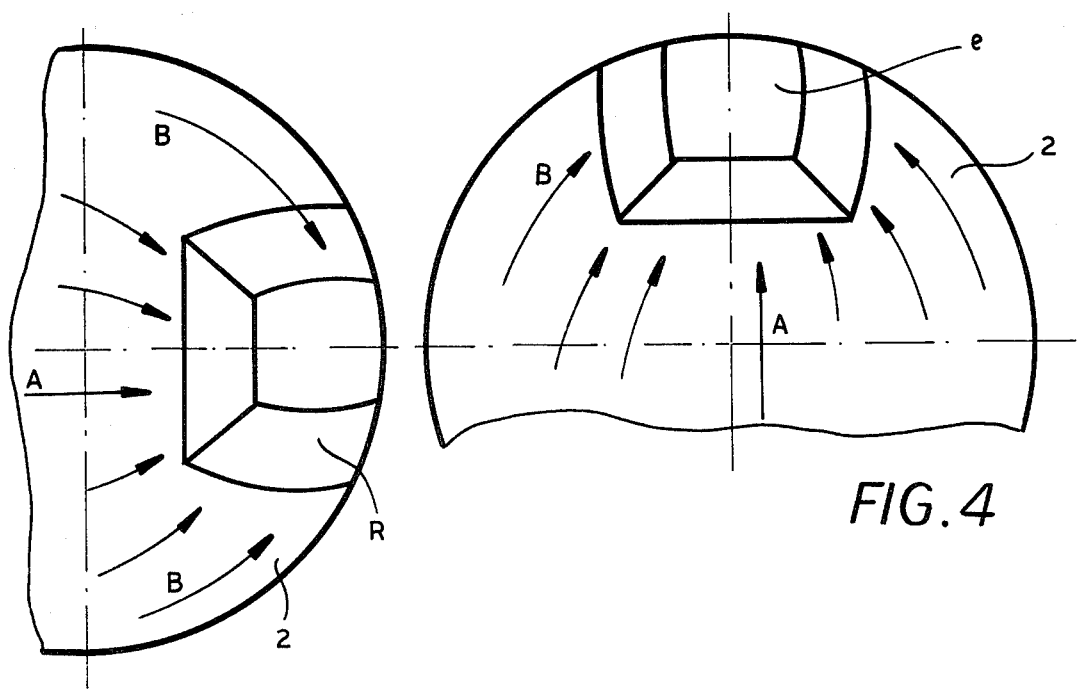
FIG. 2 is a plan view of a portion of this end of the piston.
FIG. 4 is another plan view of the piston profile.
Figure 5:
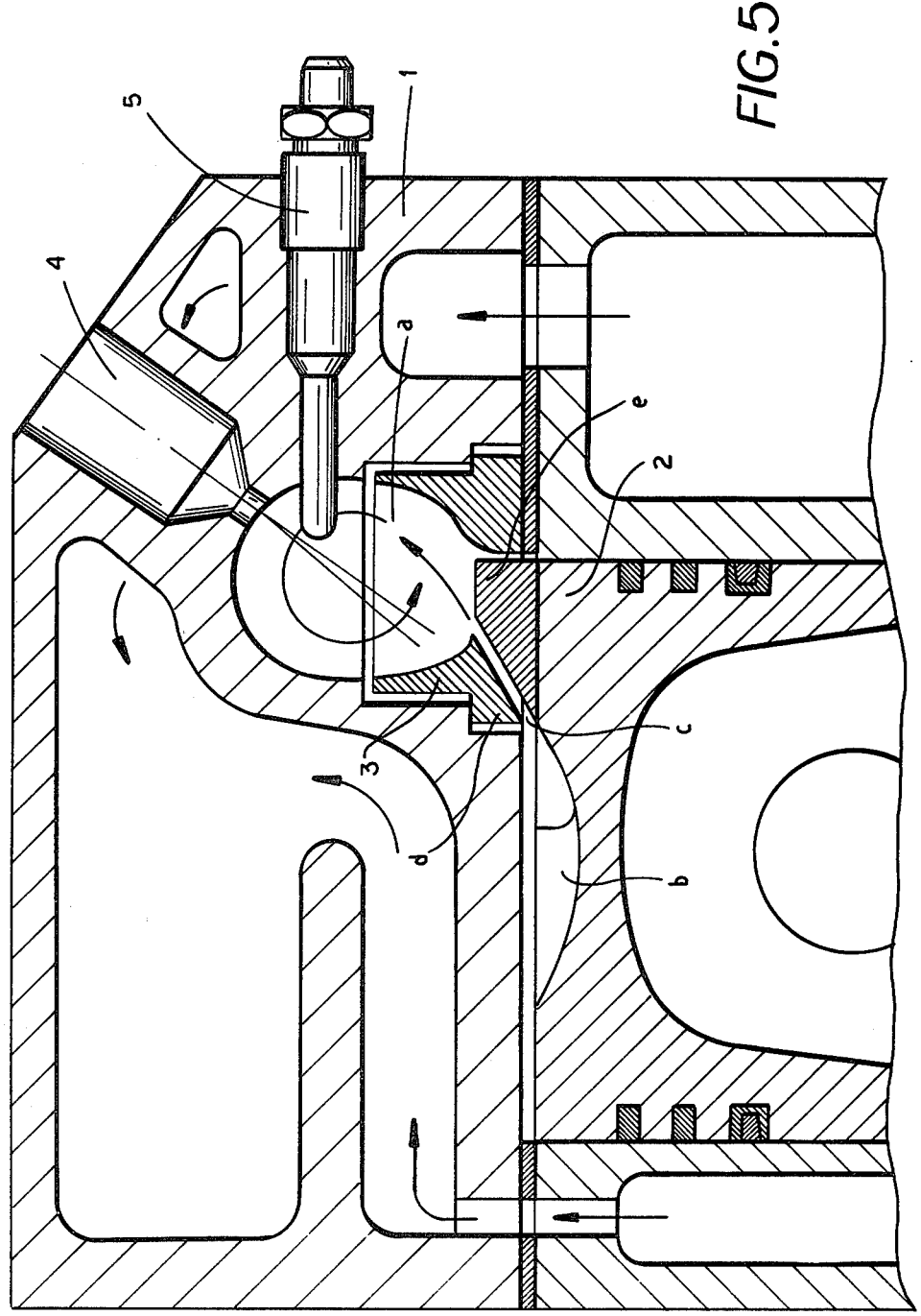
FIG. 5 is a section through an engine according to the invention in the region of the combustion chamber.

In a first embodiment, represented in FIG. 5, the divided space a has a spherical-conical form and the partitioning degree is about 50% and the air circulation in the final phase of compression, in the first place comes upon an incandescent spark plug and then penetrates in the injection area, drawing the fuel flow in the equiflow.

Figure 6:
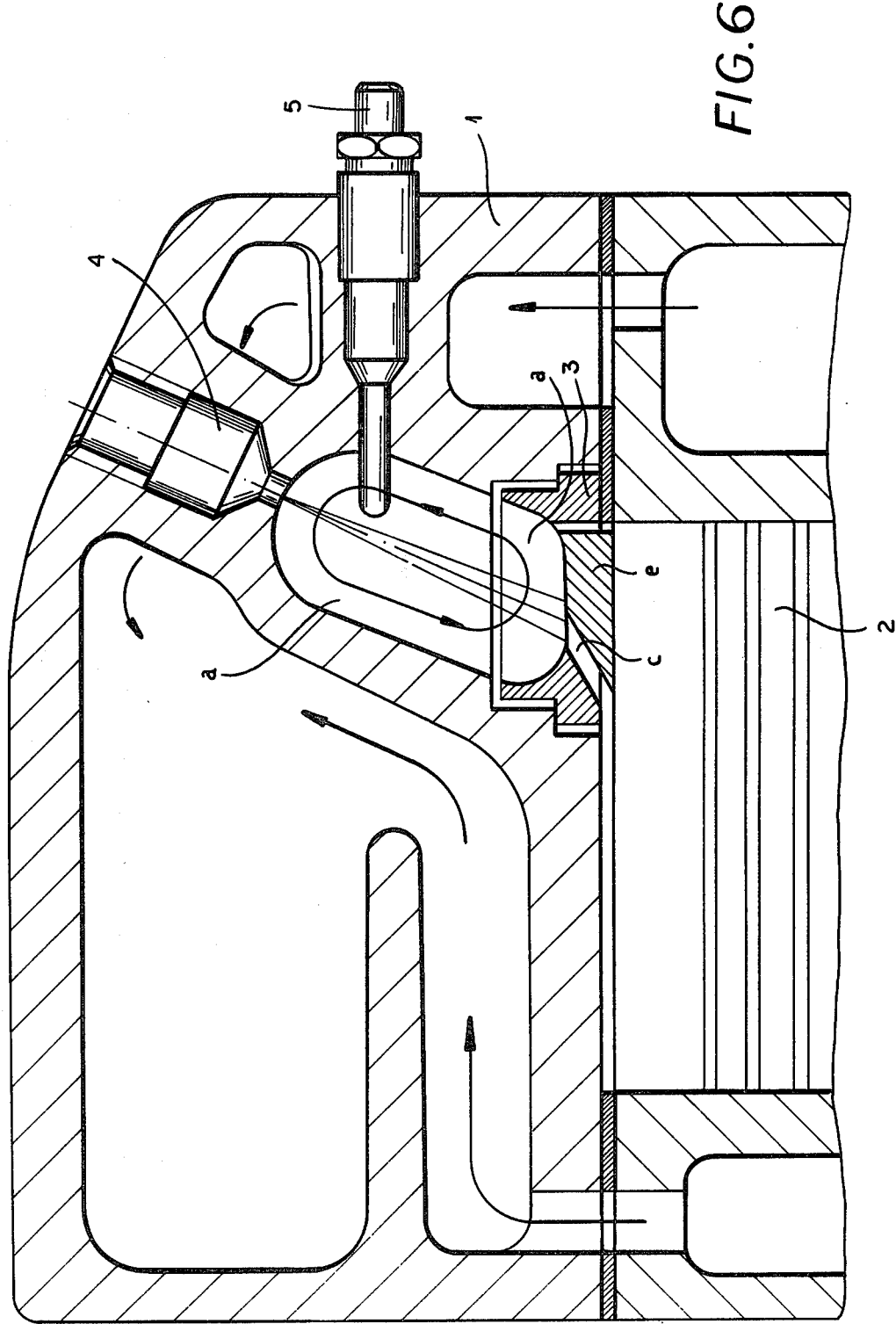
FIG. 6 is a view similar to FIG. 5 but illustrating a second embodiment.

In the second embodiment, according to FIG. 6, the swirl enclosure a has a cylindrical-spherical form, which permits a better integration of the fuel flow in the organized fluid and in the position ratio which is closer to 100%. The air circulation in the final compression phase, in the first place comes upon an incandescent spark plug 5 and then penetrates in the injection area, drawing the fuel flow in the equiflow.

Figure 7:
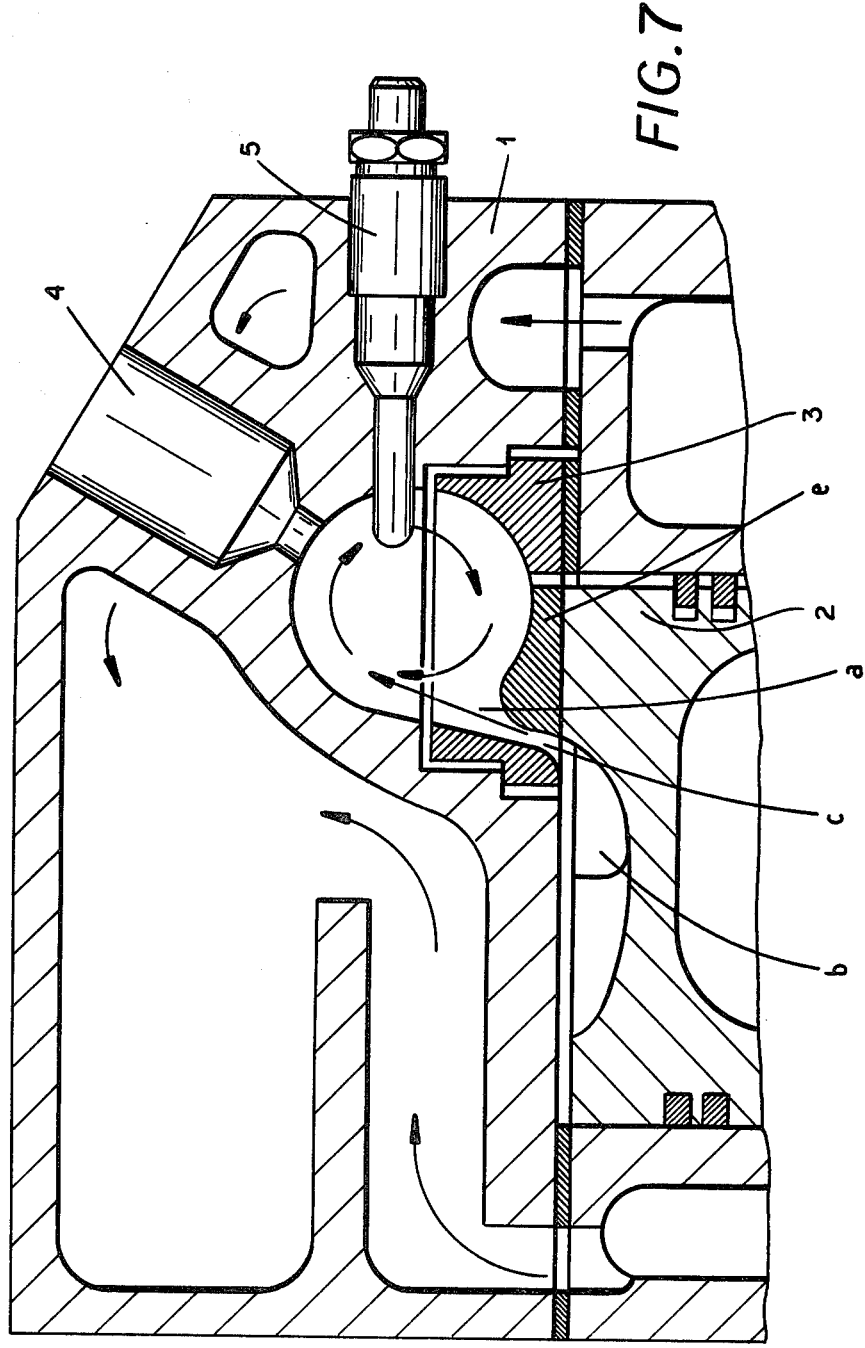
FIG. 7 is a further section through an engine representing a third embodiment of the invention.

In a third embodiment, represented in FIG. 7, the fluid flow goes across enclosure a of the combustion chamber, coming upon the fuel flow, which is drawn in the equiflow and part of the flow is deposited on the incandescent top of spark plug 5. In this manner a reduction of delay at self-ignition is achieved, thus reducing the toughness of Diesel engines and facilitating the meeting of multi-fuel combustion conditions.

We claim:

1. A combustion structure for an internal combustion engine having a cylinder formed with an end wall and a piston displaceable in said cylinder toward and away from said end wall, said combustion structure comprising:

a piston cavity concave toward said end wall and formed on said piston;

a projection on said piston laterally offset from said cavity and having a plurality of surfaces of respective inclinations while being concave in the direction of said end wall;

a cavity formed in said end wall, aligned with said projection and opening toward said piston, said cavity in said end wall and the concavity of said projection defining during an injection, ignition and combustion phase of a cycle of said piston and said cylinder, a combustion compartment so shaped that said surfaces of said projection induce at least three distinct swirls of fluid in said chamber to collectively generate a three-dimensional circulation over the entire chamber;

at least one fuel injector opening into said cavity in said end wall for introducing fuel into said circulation for mixture with said fluid;

ignition means in said chamber for igniting the mixture of fuel and fluid formed in said circulation; and wherein said projection includes three angularly adjoining surfaces, two of said surfaces being mirrorsymmetrical with respect to one another and the other of said surfaces lying substantially at right angles to the mirrorsymmetrical surfaces, said mirrorsymmetrical surfaces being inclinded to the direction of displacement of said piston at one angle and the other surface being inclined to the direction of displacement at another angle.

2. The combustion structure defined in claim 1 wherein the concavity of said projection and said cavity in said wall define a substantially spherical shape for said chamber.

3. The combustion structure defined in claim 1 wherein said concavity of said projection is relatively shallow and the cavity of said wall is relatively deep to impart an elongated configuration to said chamber.

4. The combustion structure defined in claim 1 wherein said projection and the cavity in said wall are so shaped that the circulation first meets the igniting means and then the injection means.

5. The combustion structure defined in claim 1 wherein said projection and said cavity in said wall are so shaped that said circulation first meets the injecction means and then the inition means.

* * * * *

UNITED STATES PATENT AND TRADEMARK OFFICE
CERTIFICATE OF CORRECTION

PATENT NO. : 4,483,289

DATED : November 20, 1984

INVENTOR(S) : Marius A. Paul et al.

It is certified that error appears in the above-identified patent and that said Letters Patent is hereby corrected as shown below:

On the title page item (73) to be inserted between items (75) and (21) should read:

--Assignee: Instituti National de Motoare Termice, Bucharest,

Signed and Sealed this

Sixteenth Day of July 1985

[SEAL]

Attest:

DONALD J. QUIGG

Attesting Officer     Acting Commissioner of Patents and Trademarks